(12) United States Patent
Zhang et al.

(10) Patent No.: US 11,420,163 B2
(45) Date of Patent: Aug. 23, 2022

(54) NANOFILTRATION COMPOSITE MEMBRANE, AND PREPARATION METHOD AND APPLICATION THEREOF

(71) Applicant: Nanjing University, Nanjing (CN)

(72) Inventors: Weiming Zhang, Nanjing (CN); Wenbin Zhang, Nanjing (CN); Mengqi Shi, Nanjing (CN); Bingcai Pan, Nanjing (CN); Lu Lv, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 29 days.

(21) Appl. No.: 16/725,997

(22) Filed: Dec. 23, 2019

(65) Prior Publication Data

US 2021/0121829 A1 Apr. 29, 2021

(30) Foreign Application Priority Data

Oct. 29, 2019 (CN) .................. 201911035137.X

(51) Int. Cl.
*B01D 67/00* (2006.01)
*B01D 61/02* (2006.01)
(Continued)

(52) U.S. Cl.
CPC ....... *B01D 67/0079* (2013.01); *B01D 61/027* (2013.01); *B01D 67/0095* (2013.01);
(Continued)

(58) Field of Classification Search
CPC .. B01D 67/0079; B01D 71/42; B01D 71/024; B01D 71/40; B01D 69/12;
(Continued)

(56) References Cited

U.S. PATENT DOCUMENTS

2016/0038885 A1* 2/2016 Hogen-Esch .......... B01D 61/14
210/321.6
2017/0312695 A1* 11/2017 Majumder ............ C01B 32/192
(Continued)

FOREIGN PATENT DOCUMENTS

| CN | 104129830 B | 1/2016 |
|---|---|---|
| CN | 106517578 A | 3/2017 |

OTHER PUBLICATIONS

Liu et al, J Material Science (2108) 53; 6505-6518.*
Qiu et al, Journal of Hazardous Materials 360 (2018) 122-131.*

*Primary Examiner* — Krishnan S Menon

(57) ABSTRACT

The present invention discloses a nanofiltration composite membrane, a preparation method and application thereof. The preparation method comprises: A) preparing 2D nano-material dispersion; B) first preparing a solution of a polymer material with a certain concentration, continuously adding a poor solvent under stirring conditions to subject the polymer material to chemical reaction to obtain a dispersion containing negatively charged polymer gel particles; C) subjecting the nano-material dispersion in step A) and the dispersion prepared in step B) to blending, membrane preparation and drying, and then placing the membrane into an alkaline solution with a certain concentration and pure water for soaking to obtain a nanofiltration composite membrane. The nanofiltration composite membrane can efficiently remove heavy metal complex ions through the synergistic effect of pore size screening and charge repulsion. Moreover, the rejection rate and flux of the nanofiltration composite membrane have not changed obviously after use for a long time.

3 Claims, 8 Drawing Sheets

(51) Int. Cl.
  *B01D 69/12* (2006.01)
  *B01D 71/02* (2006.01)
  *B01D 71/40* (2006.01)
  *B01D 71/42* (2006.01)
  *C02F 1/44* (2006.01)
  *C02F 101/20* (2006.01)

(52) U.S. Cl.
  CPC ........... *B01D 69/12* (2013.01); *B01D 71/024* (2013.01); *B01D 71/40* (2013.01); *B01D 71/42* (2013.01); *C02F 1/442* (2013.01); *C02F 2101/20* (2013.01)

(58) Field of Classification Search
  CPC ... B01D 67/0095; B01D 61/027; C02F 1/442; C02F 2101/20
  See application file for complete search history.

(56) References Cited

U.S. PATENT DOCUMENTS

| | | | | |
|---|---|---|---|---|
| 2018/0141008 A1* | 5/2018 | Prince | .................... | B01D 71/40 |
| 2019/0314770 A1* | 10/2019 | Wang | ...................... | C02F 1/441 |
| 2020/0055005 A1* | 2/2020 | Zhang | ................ | B01D 67/0018 |
| 2020/0324253 A1* | 10/2020 | Loh | ................... | B01D 67/0095 |

* cited by examiner

NANOFILTRATION COMPOSITE MEMBRANE, AND PREPARATION METHOD AND APPLICATION THEREOF

CROSS-REFERENCE TO RELATED APPLICATIONS

This application claims priority to Chinese Patent Application No. 201911035137.X, filed on Oct. 29, 2019 in the Chinese Intellectual Property Office, the disclosures of which is incorporated herein by reference.

TECHNICAL FIELD

The present invention belongs to the field of wastewater treatment, and in particular, relates to a nanofiltration composite membrane for removing heavy metal complex ions, and a preparation method and application thereof.

BACKGROUND

A large amount of wastewater containing heavy metals is discharged in the production process in electroplating, leather making, mining and other industries. These heavy metals and complexing agents are combined to form heavy metal complex ions. The heavy metal complex ions have a large migration range and high stability, causing great harm to the environment and people's health. Theoretically, the objective of adsorbing and removing heavy metal complex ions can be achieved by using a polymer nanofiltration membrane. However, the heavy metal complex ions are generally organic complexing agents, which usually cause polymer membranes to swell when used, thus causing serious membrane pollution, and finally significantly reducing the separation efficiency. Therefore, the heavy metal complex ions are not suitable for practical use. Currently, the commonly used method includes first breaking the heavy metal complex ions to separate heavy metals from the complex, and then adopting a conventional method for treating heavy metals. Now, this becomes a universal treatment method. At present, methods for treating the heavy metal complex ions mainly include breaking the complex by advanced oxidation (fenton reaction, photocatalysis, electro-oxidation, and the like), and then respectively removing free heavy metals by chemical adsorption or precipitation.

By searching, it is found that relevant application cases have been disclosed in the prior art. For example, Chinese patent No.201611032142.1 with application publication date of Mar. 22, 2017 discloses a method for heavy metal wastewater treatment by breaking a complex through granular sludge and a ceramic membrane, and a heavy metal wastewater treatment system and method for removing complex. The system includes a stirred reactor, configured for the mixing reaction of sludge wastewater containing complex heavy metals, a pH adjusting chemical liquid and a complex-breaking agent under stirring to convert at least part of complex heavy metal ions into a particle state; and a membrane separation tank connected to the stirred reactor, where a rejecting membrane is disposed in the membrane separation tank and used for rejecting particles in a mixed liquid after the mixing reaction, a sludge granular layer formed by rejection and the rejecting membrane cooperate to further capture heavy metal particles converted into a particle state and complex heavy metal ions which are not fully reacted, and the rejected substance becomes a part of the sludge granular layer to participate in rejection, while clear water passes through membrane holes of the rejecting membrane and is pumped to a clear water tank by a membrane suction pump.

Another example is Chinese patent No.201310160786.9 with the date of authorization proclamation of Jan. 20, 2016, which discloses a photoelectrocatalysis method for treating heavy metal complex wastewater and recovering heavy metal ions therefrom. More specifically, the method includes irradiating the surface of a $TiO_2$ film of an anode with ultraviolet light having a wavelength less than 387 nm in a photoelectric reactor accommodating the wastewater to generate photo-generated holes and hydroxyl radicals as strong oxidants, which degrade the heavy metal complex; and meanwhile recovering free heavy metal ions at a cathode through electrodeposition reduction. The photoelectric reactor includes an ultraviolet lamp which emits the ultraviolet light, an anode which is a titanium substrate $TiO_2$ film electrode, and a cathode; wherein the anode and the cathode are connected to a positive pole and a negative pole of a DC power supply, respectively.

The methods of the foregoing applications have high requirements for the pH of water and may cause secondary pollution. Therefore, in view of the defects of the prior art, there is an urgent need to provide a method which can not only efficiently remove heavy metal complex ions, but also avoid defects of high requirements for the pH of water and possible secondary pollution.

SUMMARY

1. Problems to be Solved

In view of the problems in the prior art that the removal of heavy metal complex ions has high requirements for the pH of water and may cause secondary pollution, the present invention provides a composite membrane capable of efficiently removing heavy metal complex ions through the synergistic effect of pore size screening and charge repulsion.

2. Technical Solutions

In order to solve the foregoing problems, the technical solutions adopted by the present invention are as follows:

The present invention provides a nanofiltration composite membrane for removing heavy metal complex ions, and a preparation method of the nanofiltration composite membrane comprises the following steps:

A) using water as a solvent, preparing a 2D nano-material dispersion;

B) first preparing a solution of a polymer material with a certain concentration, continuously adding a poor solvent under stirring conditions to induce the generation of polymer gel particles, and further subjecting the polymer material to nucleophilic reaction to obtain a dispersion containing negatively charged polymer gel particles; and C) subjecting the nano-material dispersion in step A) and the solution prepared in step B) to blending, membrane preparation and drying, and then placing the membrane into pure water for soaking to obtain a nanofiltration composite membrane.

As a further improvement of the present invention, the poor solvent includes, but is not limited to, ethanol, water, hexane, acetonitrile and petroleum ether.

As a further improvement of the present invention, the polymer material includes, but is not limited to any one of polyacrylonitrile (PAN), sodium polyethylene sulfonate, polymethacrylic acid (PMAA), and polymethyl methacrylate.

As a further improvement of the present invention, the 2D nano-material includes, but is not limited to any one of graphene oxide, $MoS_2$, LDH, or Mxene.

As a further improvement of the present invention, the polymer gel particles have a particle size of 0.5-10 nm.

As a further improvement of the present invention, the 2D nano-material dispersion prepared in step A) has a concentration of 0.001-10 mg/mL.

As a further improvement of the present invention, the volume of the poor solvent added in step B) accounts for 5%-85% of a total volume of the solution, and the total volume of the solution is a total volume after the adding of the poor solvent.

As a further improvement of the present invention, the membrane thickness is controlled to be 5 nm to 50 μm when the membrane is made in step C).

As a further improvement of the present invention, a method for membrane preparation in step C) includes any one of vacuum filtration, heating stage tape casting, and a method for membrane preparation by a spin coater.

As a further improvement of the present invention, when the nano-material dispersion in step A) is blended with the solution prepared in step B), the mass ratio of the 2D nano-material to the polymer material is 1:(0.001-10).

As a further improvement of the present invention, the use of the nanofiltration composite membrane for removing heavy metal complex ions is provided, where the nanofiltration composite membrane is used for removing heavy metal complex ions from water.

3. Beneficial Effects

Compared with the prior art, beneficial effects of the present invention are as follows:

(1) For the nanofiltration composite membrane of the present invention, the prepared dispersion containing the negatively charged polymer gel particles and the 2D nano-material dispersion are subjected to a blending reaction to prepare a membrane, so that the nanofiltration composite membrane with excellent size screening performance and electrostatic repulsion performance is obtained. The nanofiltration composite membrane can effectively remove substances which are difficult to remove seperately, such as heavy metal complex ions. In the prior art, commonly used methods for removing the heavy metal complex ions include: first using an advanced oxidation/complex breaking agent to break a complex, and then removing free heavy metals by chemical adsorption or precipitation. Therefore, the methods commonly have defects of high requirements for the pH of water and possible secondary pollution. However, the nanofiltration composite membrane of the present invention can be directly used for adsorption and removal of heavy metal complex ions, breaks through technical difficulties, not only has low requirements on water quality, but also does not generate secondary pollution, and is convenient to use.

(2) The nanofiltration composite membrane provided by the present invention is used for removing heavy metal complex ions. Compared with a membrane (graphene oxide membrane) prepared from only 2D nano-materials, the nanofiltration composite membrane has higher negative electricity performance; and the removal performance of the nanofiltration composite membrane on the heavy metal complex ions with negative charge can be effectively improved through the electrostatic repulsion performance. In addition, the introduction of the polymer particles can significantly improve the size screening performance of the membrane. Through the synergistic effect of size screening and negatively charged performance, the rejection performance of the composite membrane of the present invention for the heavy metal complex ions is greatly improved. The nanofiltration composite membrane prepared in the present invention has excellent removal performance for complex ions of different heavy metals and complex ions of different coordination heavy metals. The rejection rates for Cu-NTA, Cu-CA and Cu-EDTA are all more than 96%, and the flux is more than 12 $L/m^2h$. The rejection rates for Cu-EDTA, Ni-EDTA and Cr-EDTA are all more than 97%, and the flux is more than 12 $L/m^2h$.

(3) The nanofiltration composite membrane of the present invention is a novel nanofiltration membrane compounded with the 2D nano-material and the polymer gel particles. As an inorganic membrane, the nanofiltration composite membrane is not subjected to swelling caused by contact with heavy metal complex ions after long-term use. Experiments show that the nanofiltration composite membrane of the present invention has no obvious change in flux and rejection rate for 120 h in long-time Cu-EDTA removal test, indicating that the nanofiltration membrane still maintains good removal performance after operating for 120 h. Therefore, the problems that swelling of the polymer membrane and membrane pollution, which caused when the heavy metal complex ions are adsorbed and removed by using a polymer nanofiltration membrane, finally obviously reducing the separation efficiency are overcome at the same time.

DETAILED DESCRIPTION

The present invention is further described below with reference to specific embodiments.

EXAMPLE 1

A method for preparing a nanofiltration membrane for removing heavy metal complex ions in this example comprises the following steps:

1) Using water as a solvent, preparing a GO dispersion with a concentration of 10 mg/mL;

2) Dissolving polymethacrylic acid (PMAA) in dimethylacetamide (DMAc) to obtain a solution (PMAA/DMAc) with a concentration of 100 mg/ml, continuously adding petroleum ether with stirring to induce the generation of polymer gel particles, and further subjecting the polymer material to nucleophilic reaction to obtain a dispersion containing negatively charged polymer gel particles; wherein an added volume of the petroleum ether accounts for 5% of a total volume of the solution; and the polymer gel particles have a particle size of 0.5-10 nm, which is confirmed by TEM characterization;

3) Blending the GO dispersion in step 1) with the solution obtained in step 2), wherein the mass ratio of the GO to the PMAA in the blended solution is 1:1.

Figure 1:
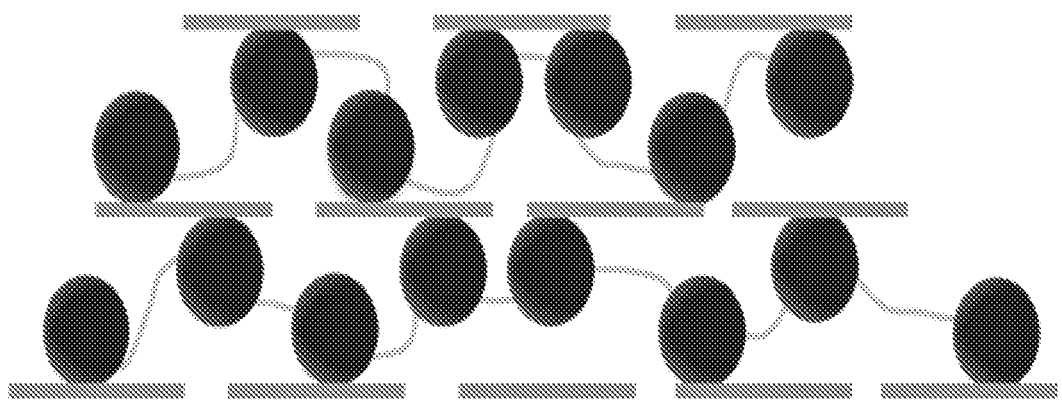
FIG. 1 is a schematic diagram of a nanofiltration composite membrane.

Prepare a membrane by vacuum filtration, wherein the thickness of the membrane is controlled at 1 μm; after the membrane is dried, first place the membrane in a 10% wt disodium hydrogen phosphate solution for soaking for 2 h, and then soak the membrane in pure water, and take out the membrane to obtain the GO nanofiltration composite membrane. FIG. 1 is a schematic structural diagram of a nanofiltration composite membrane.

Figure 2:
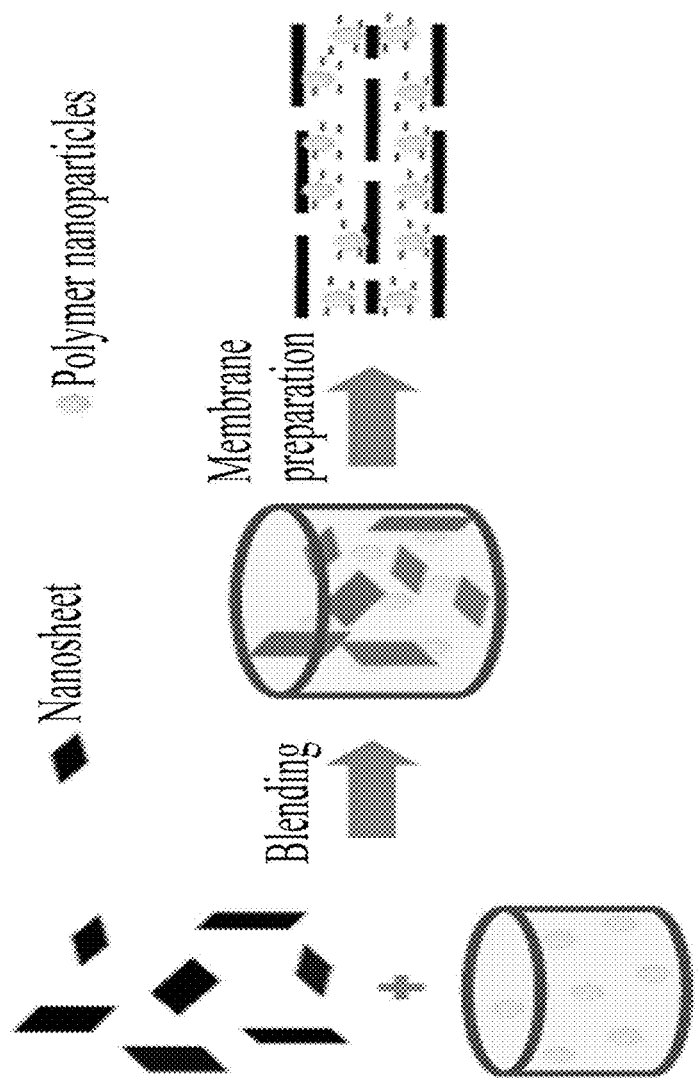
FIG. 2 is a preparation flowchart of a nanofiltration composite membrane.
Figure 3:
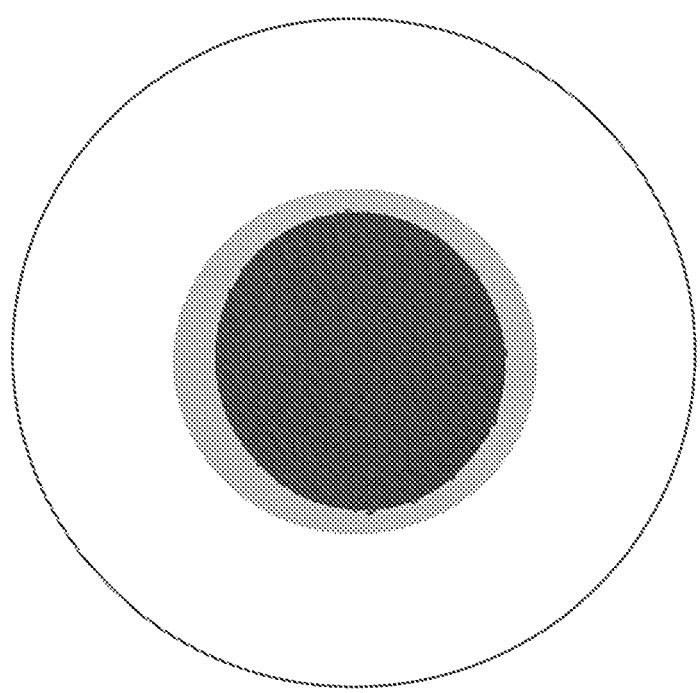
FIG. 3 illustrates a nanofiltration composite membrane prepared in Example 1.

FIG. 2 is a preparation flowchart of a nanofiltration composite membrane, illustrating preparation steps of the nanofiltration composite membrane. FIG. 3 illustrates a (GO/PMAA) nanofiltration composite membrane prepared in Example 1.

Figure 4:
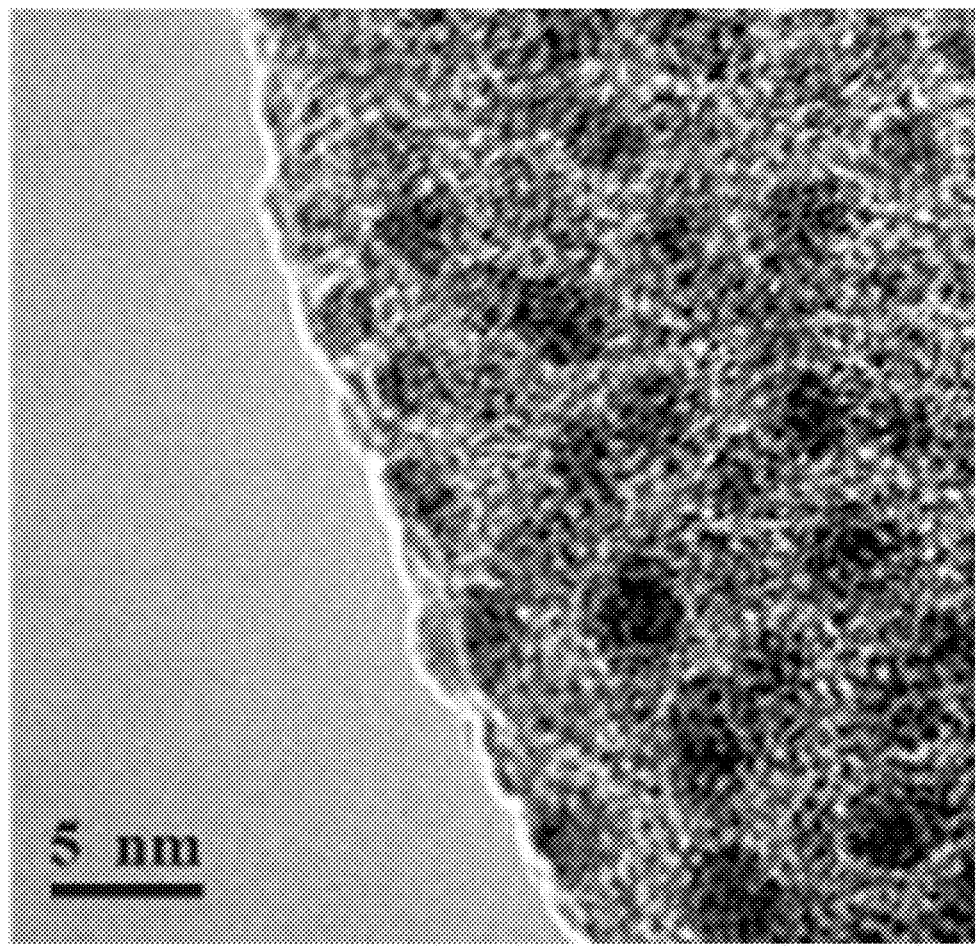
FIG. 4 is a transmission electron microscope (TEM) photograph of a nanofiltration composite membrane prepared in Example 1.

FIG. 4 is a TEM photograph of the nanofiltration composite membrane prepared according to the method in Example 1. As can be seen from FIG. 4, the size of the polymer gel particles is 2-3 nm, and the polymer gel particles are uniformly dispersed in the GO membrane without obvious agglomeration.

EXAMPLE 2

A method for preparing a nanofiltration composite membrane for removing heavy metal complex ions in this example comprises the following steps:

1) Using water as a solvent, preparing a molybdenum disulfide ($MoS_2$) dispersion with a concentration of 0.02 mg/mL;

2) Dissolving polyacrylonitrile (PAN) in N-methyl pyrrolidone (NMP) to obtain a (PAN/NMP) solution with a concentration of 1 mg/ml, continuously adding water with stirring, wherein an added volume of the water accounts for 15% of a total volume of the solution; subjecting the polymer material to nucleophilic reaction to obtain a dispersion containing negatively charged polymer gel particles; the polymer gel particles have a particle size of 0.5-10 nm which is confirmed by TEM characterization;

3) Blending the $MoS_2$ dispersion in step 1) with the solution obtained in step 2), wherein the mass ratio of the $MoS_2$ to the PAN in the blended solution is 1:0.001, and preparing a membrane by using heating stage tape casting, wherein the membrane thickness is controlled at 50 μm; after the membrane is dried, place the membrane in a 1% wt $KHCO_3$ solution for soaking for 24 h, followed by pure water, and take out the membrane to obtain the $MoS_2$ nanofiltration composite membrane.

EXAMPLE 3

A method for preparing a nanofiltration composite membrane for removing heavy metal complex ions in this example comprises the following steps:

1) Using water as a solvent, preparing a GO dispersion with a concentration of 0.001 mg/mL.

2) Preparing a polymethyl acrylate (PAN/NMP) solution (0.1 mg/ml), and continuously adding anhydrous ethanol with stirring, wherein an added volume of the anhydrous ethanol accounts for 85% of a total volume of the solution; subjecting the polymer material to nucleophilic reaction to obtain a dispersion containing negatively charged polymer gel particles; the polymer gel particles have a particle size of 0.5-10 nm which is confirmed by TEM characterization;

3) Blending the GO dispersion in step 1) with the solution obtained in step 2), wherein the mass ratio of the GO to the PMA in the blended solution is 1:10, and preparing a membrane by using a spin coater, wherein the membrane thickness is controlled at 5 nm; after the membrane is dried, first place the membrane in a 0.05% wt NaOH solution for soaking for 24 h, then soak the membrane in pure water, and take out the membrane to obtain a (GO/PMA) nanofiltration composite membrane.

Comparative Example

This comparative example is a method for preparing a GO membrane, which comprises the following steps:

Using water as a solvent, preparing a GO dispersion with a concentration of 10 mg/mL; preparing a membrane by vacuum filtration, wherein the membrane thickness is controlled at 1 μm, and drying the membrane to obtain the GO membrane.

EXAMPLE 4

In this example, the performance test of the membranes prepared in Example 1 and comparative example is as follows:

The nanofiltration composite membrane prepared by the present invention is used for performing removal testing on complex ions of different complexing agents (metal complex ions) and coordination heavy metals, and specific experimental conditions are as follows: Cu-EDTA, Ni-EDTA and Cr-EDTA solutions with concentrations of 10 mg/L (calculated by heavy metal ions) respectively are adopted to simulate wastewater, and the nanofiltration composite membrane prepared in Example 1 is adopted for filtration test.

The test is conducted by dead end filtration, and the filtration pressure is controlled at 1 bar by a vacuum water pump. The concentrations of heavy metals in a stock solution and a filtrate are determined by inductively coupled plasma (ICP). The rejection rate (R%) and a calculation method are calculated according to Formula 1:

$$R\% = \frac{c_0 - c_t}{c_0} \times 100\% \qquad \text{Formula 1}$$

where $c_0$ and $c_t$ are the concentrations of heavy metals in the stock solution and the filtrate respectively.

A method for calculating a flux is implemented according to Formula 2

$$\text{Flux} = \frac{V}{A \cdot t \cdot \Delta P} \qquad \text{Formula 2}$$

where v, A, t, and Δp are the volume of the filtrate, the area of a tested membrane, test time and transmembrane pressure respectively.

Figure 5:
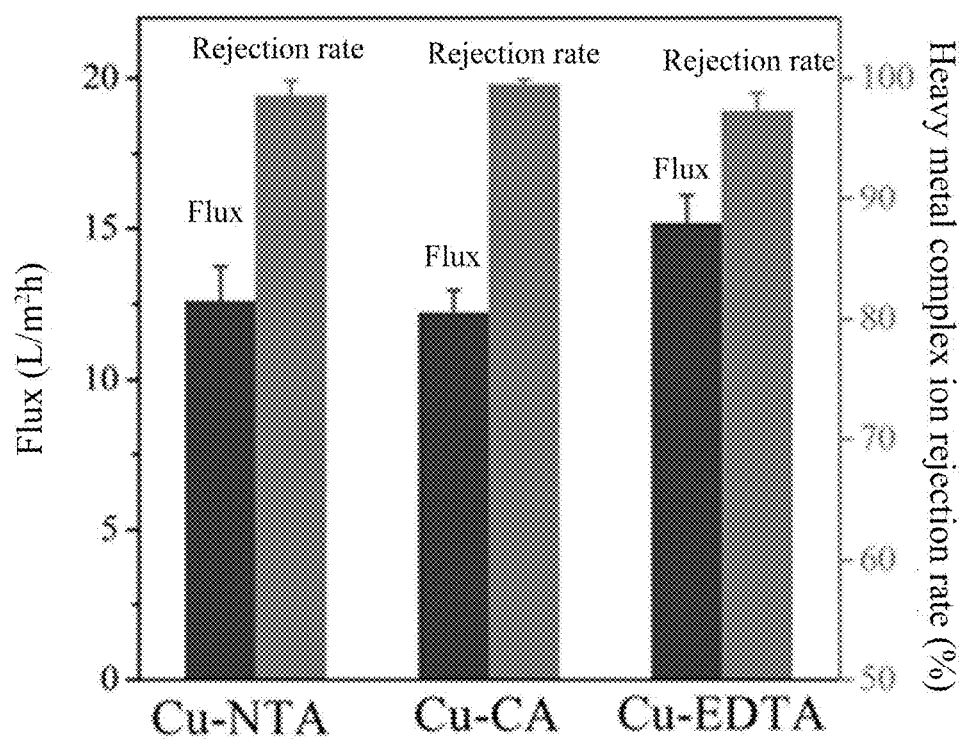
FIG. 5 is a diagram showing the removal of different heavy metal complex ions by the nanofiltration composite membrane prepared in Example 1.

FIG. 5 is a diagram showing the removal of different heavy metal complex ions by the nanofiltration composite membrane prepared in Example 1. In the figure, for each heavy metal complex ion, a left histogram represents flux and a right histogram represents rejection rate. The results show that the nanofiltration composite membrane of the present invention has rejection rates more than 96% for Cu-NTA, Cu-CA and Cu-EDTA and flux more than 12 $L/m^2h$.

Figure 6:
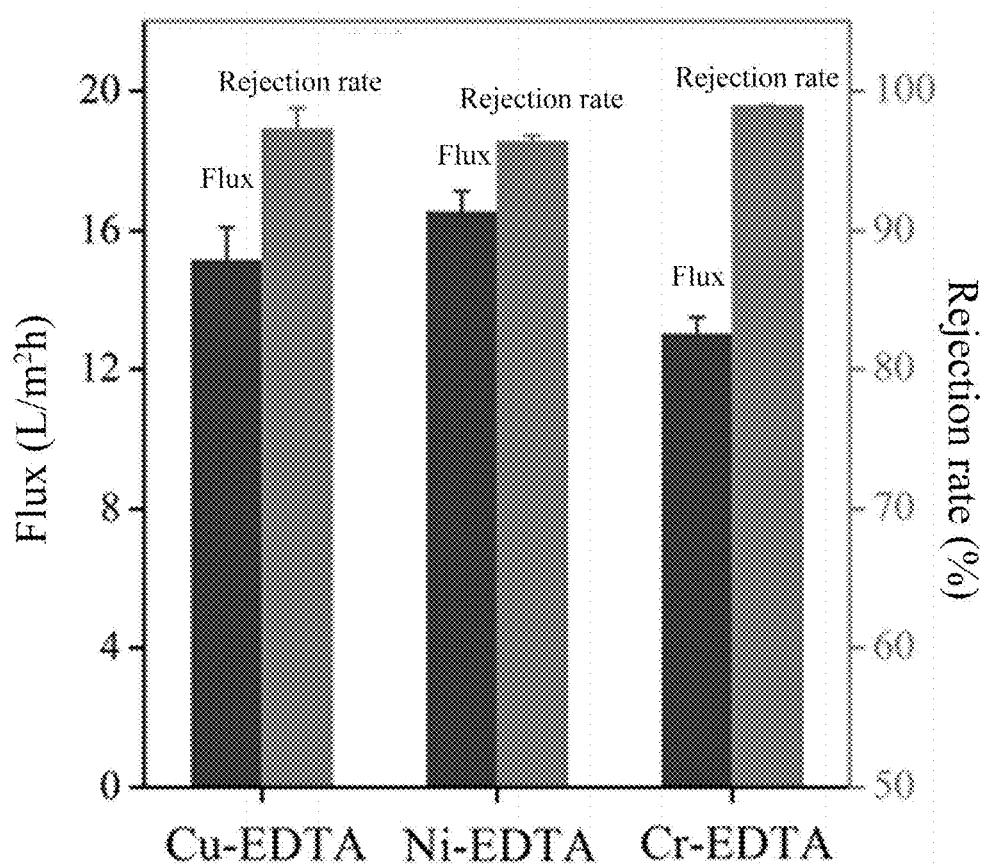
FIG. 6 is a diagram showing the removal of complex ions of different coordination heavy metals by the nanofiltration composite membrane prepared in Example 1.

FIG. 6 is a diagram showing the removal of complex ions of different coordination heavy metals by the nanofiltration composite membrane prepared in Example 1. In the figure, for complex ions of each coordination heavy metal, a left histogram represents flux and a right histogram represents rejection rate. The results show that the nanofiltration composite membrane of the present invention has rejection rates more than 97% for Cu-EDTA, Ni-EDTA and Cr-EDTA and flux more than 12 $L/m^2h$.

EXAMPLE 5

In this example, the long-term performance test of the membrane prepared in Example 1 is carried out, a test method is basically the same as that of Example 4, except that the test conditions are: the concentration of Cu-EDTA in a simulated solution is 10 ppm, the test is conducted by dead end filtration, and the filtration pressure is controlled at 1 bar by a vacuum water pump.

Figure 7:
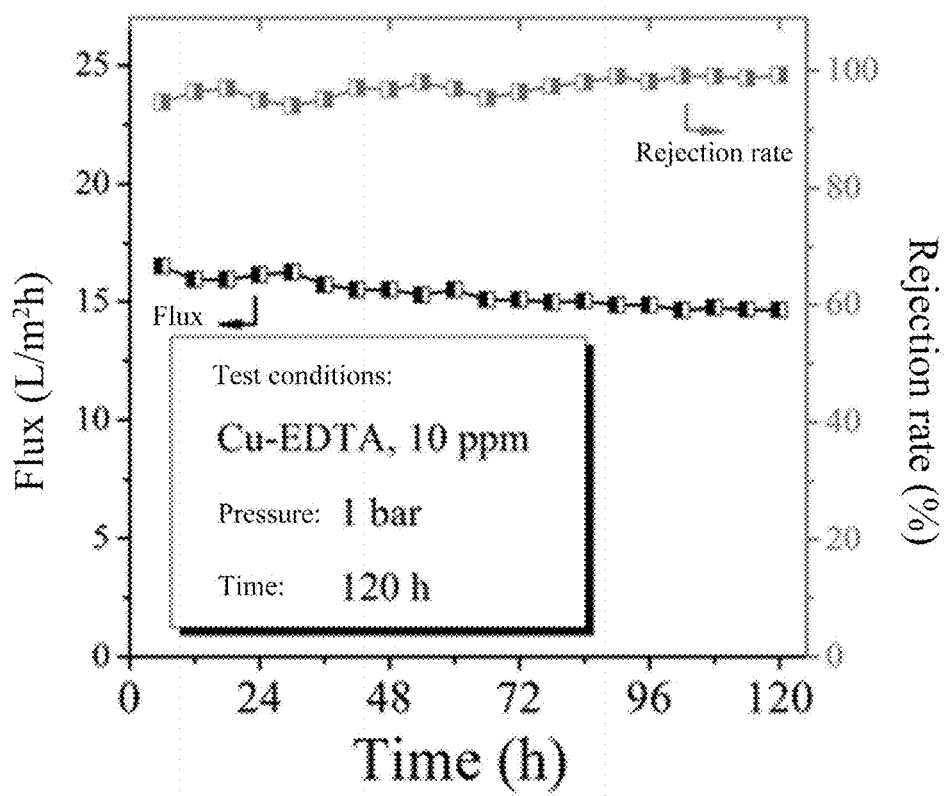
FIG. 7 is a diagram showing a long-time test of removal of Cu-EDTA by the nanofiltration composite membrane prepared in Example 1.

FIG. 7 shows a long-time test of removal of Cu-EDTA by the nanofiltration composite membrane prepared in Example 1. In the figure, an upper curve represents the change of rejection rate, and a lower curve represents the change of flux. The results show that there is no obvious change in the flux and rejection rate during the continuous 120 h test, which indicates that the nanofiltration membrane of the present invention still maintains good removal performance after operating for 120 h.

EXAMPLE 6

This example compares the Cu-EDTA rejection rates of the pure GO membrane and the nanofiltration composite membrane (GO/PMAA membrane) of the present invention. The test method is basically the same as that of Example 4, except that the concentration of Cu-EDTA in a simulated solution is 10 ppm.

Figure 8:
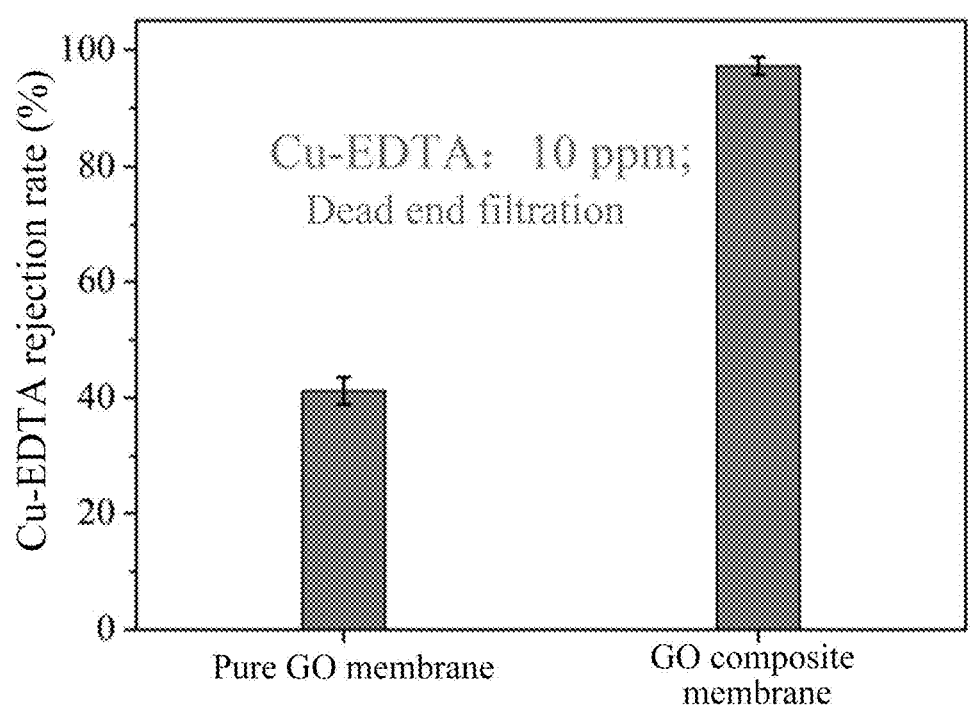
FIG. 8 is a comparison of Cu-EDTA rejection rates of a pure Graphene Oxide (GO) membrane in Comparative Example 1 and a nanofiltration composite membrane (GO/PMAA) of the present invention.

FIG. 8 is a comparison of Cu-EDTA rejection rates of a pure graphene oxide (GO) membrane in Comparative Example 1 and the nanofiltration composite membrane (GO/PMAA) of the present invention. The rejection rate of the pure GO membrane is 41%, and the rejection rate of the GO membrane of the present invention is 97%.

According to the results, compared with the GO membrane, the (GO/PMAA) nanofiltration composite membrane of the present invention has higher negative electricity performance; and the removal performance of the nanofiltration composite membrane on the heavy metal complex ions with negative charge can be effectively improved through the electrostatic repulsion performance. In addition, the doping of the polymer particles can significantly improve the size screening performance of the membrane. Through the synergy of the two effects, the composite membrane of the present invention can obviously improve the rejection performance on heavy metal complex ions.

The present invention has been described in detail above in combination with the specific exemplary examples. However, it should be understood that various modifications and variations can be made without departing from the scope of the present invention as defined by the appended claims. The detailed description and accompanying drawings should be considered as illustrative only and not restrictive, and if there are any such modifications and variations, they will fall within the scope of the present invention described herein. In addition, the background is intended to illustrate the research and development status and significance of the technology, and is not intended to limit the present invention or the present application and application fields of the present invention.

What is claimed is:

1. A nanofiltration composite membrane, comprising:
   a 2D nano-material comprising graphene oxide or $MoS_2$; and
   a plurality of polymer gel particles that are uniformly dispersed in interlayer spaces of the 2D nano-material to form a channel for water permeation, the plurality of polymer gel particles being negatively charged polymer gel particles, having a particle size of 0.5-10 nm, and comprising polymethacrylic acid (PMAA) or polyacrylonitrile (PAN);
   wherein a mass ratio of the graphene oxide to the PMAA in the nanofiltration composite membrane is 1:1, or a mass ratio of the $MoS_2$ to the PAN in the nanofiltration composite membrane is 1:0.001.

2. The nanofiltration composite membrane according to claim 1, wherein the membrane thickness is 5 nm to 50 μm.

3. The nanofiltration composite membrane according to claim 1, wherein the plurality of polymer gel particles are uniformly distributed in interlayer spaces of the 2D nano-material in the nanofiltration composite membrane to form a channel for water permeation.

* * * * *